United States Patent
Jang et al.

(10) Patent No.: US 7,091,290 B2
(45) Date of Patent: Aug. 15, 2006

(54) METHOD FOR PREPARING HOMO-AND CO-POLYMERS OF CYCLIC OLEFIN COMPOUNDS USING AN ORGANIC BORON COMPOUND AS A CATALYST ACTIVATOR

(75) Inventors: Young Chan Jang, Daejeon (KR); Hyun Kyung Sung, Daejeon (KR)

(73) Assignee: Korea Kumho Petrochemical Co., Ltd., Seoul (KR)

(*) Notice: Subject to any disclaimer, the term of this patent is extended or adjusted under 35 U.S.C. 154(b) by 0 days.

(21) Appl. No.: 10/995,759

(22) Filed: Nov. 23, 2004

(65) Prior Publication Data

US 2005/0245703 A1   Nov. 3, 2005

(30) Foreign Application Priority Data

Apr. 29, 2004   (KR) .................. 10-2004-0029773

(51) Int. Cl.
*C08F 4/44*   (2006.01)

(52) U.S. Cl. .............. 526/134; 526/154; 526/171; 526/172; 526/281

(58) Field of Classification Search ............... 526/134, 526/154, 171, 172, 281
See application file for complete search history.

(56) References Cited

U.S. PATENT DOCUMENTS 6,384,144 B1 *   5/2002   Mecking ................ 525/191

FOREIGN PATENT DOCUMENTS

| EP | 0-504-418 A1 | 9/1992 |
|----|--------------|--------|
| JP | 61-221206 | 10/1986 |
| JP | 61-271308 | 12/1986 |
| JP | 62-252406 | 11/1987 |
| JP | 64-000106 | 1/1989 |
| JP | 64-066216 | 3/1989 |

* cited by examiner

*Primary Examiner*—Robert D. Harlan
(74) *Attorney, Agent, or Firm*—Davidson, Davidson & Kappel, LLC

(57) ABSTRACT

The present invention relates to a method for preparing homo- and co-polymers having high molecular weights in high yields by polymerizing cyclic olefin compounds using a complex prepared by mixing a nickel salt compound, an organoaluminoxane compound, and at least one organic boron compound.

17 Claims, No Drawings

METHOD FOR PREPARING HOMO-AND CO-POLYMERS OF CYCLIC OLEFIN COMPOUNDS USING AN ORGANIC BORON COMPOUND AS A CATALYST ACTIVATOR

BACKGROUND OF THE INVENTION

1. The Field of the Invention

This invention relates to a method for preparing homo- and co-polymers of cyclic olefin compounds. More particularly, this invention relates to a method for preparing homo- and co-polymers by polymerization of cyclic olefin compounds that uses an organic boron compound as a catalyst activator, forming a homogeneous catalyst system having a high solubility in a non-polar solvent, together with a nickel salt compound and an organoaluminoxane compound to prepare cyclic polymers having high molecular weights in high yields.

2. Related Prior Art

The copolymer of ethylene or propylene and a cyclic olefin compound is endowed with excellent properties such as transparency, heat resistance, etc., which hardly appear in the existing polymers such as polyethylene or polypropylene, with the introduction of a rigid ring structure such as norbornene into the main chain of the polymer. Accordingly, the homopolymer/copolymer of a cyclic olefin compound is expected to substitute for a polycarbonate (PC) or polymethylmethacrylate (PMMA) resin currently used as an information recording material, and possibly utilized as an optical material with transparency and low moisture absorption for various applications such as DVD, CD, lens, optical fiber, and the like.

Currently, various norbornene derivatives having different alkyl groups and polar functional groups are used for the preparation of cyclic olefin polymers. Such norbornene derivatives are useful for the preparation of homopolymers as well as copolymers using ethylene or propylene.

Some advanced manufacturers of cyclic olefin polymers have recently been developing novel materials having epoch-making thermal, mechanical and optical properties, which are unattainable by the existing polyolefins, through copolymerization of styrene, cyclic olefin, methylmethacrylate, or the like. In particular, the polymers prepared by copolymerization of cyclic olefin and ethylene are standing in the spotlight as a next-generation information recording material such as CD, DVD, and so forth due to their remarkably excellent optical and thermal properties.

The norbornene polymers not only substitute for polycarbonate used for the aforementioned applications but also reduce the space between CD tracks to allow high integration, so they are applicable to next-generation DVD (e.g., HD-DVD), or the like. In addition, such norbornene polymers are widely used for more various applications such as camcorders or automobile cameras due to their excellent properties such as optical properties, dimensional stability, excess moisture tolerance, low density, and so forth.

The polymerization catalysts for preparation of a polymer using a cyclic olefin compound can be classified into an addition polymerization catalyst, a ROMP (Ring Opening Metathesis Polymerization) catalyst, and a cationic catalyst, including a radical initiator.

Among these, the addition polymerization catalyst, the ROMP catalyst and the cationic catalyst have a common characteristic that they can be used for preparation of cyclic olefin polymers with high transparency. The use of the ROMP catalyst necessarily demands a step of saturating the double bonds of the polymer after polymerization, and the addition polymerization catalyst is used for preparation of a cyclic olefin polymer having a low dielectric property (i.e., insulating property).

The representative metals constituting the addition polymerization catalyst include Ti, Zr, Cr, Co, Ni, Pd, and the like. Among these metals, Ni and Pd are representative metals for preparation of a cyclic olefin polymer.

The representative main metals constituting the ROMP catalyst include Mo, W, Ru, Re, or the like. The activity of the catalyst can be controlled through a modification of the ligands around the metal or a change in the additives.

The cyclic olefin polymer, whose principal advantages are low density, high transparency, low moisture absorbency, and heat resistance, is expected to substitute for glass, acrylic polymer, polycarbonate, and polyvinylidene chloride (PVDC).

As an example of the conventional methods using a transition metal as a polymerization catalyst in the preparation of homo- and co-polymers from norbornene and its derivatives, U.S. Pat. No. 3,330,815 discloses a method for addition polymerization of norbornene using a complex prepared from $TiCl_3$ (or $TiCl_4$) and an organoaluminum compound, or $Pd(C_6H_5CN)_2Cl_2$ as a catalyst. Disadvantageously, this method provides a polymer having a number average molecular weight ($M_n$) of less than 10,000 in a low yield.

Another example is a method for addition polymerization of norbornene and its derivatives using a complex prepared from a bidentate ligand, Ni(0) salt and $B(C_6F_5)_3$ as disclosed in U.S. Pat. Nos. 6,350,837 B1 and 6,538,085 B2. In this case, however, one of the components of the catalyst, $B(C_6F_5)_3$ is a very expensive compound, so the method is limited in its industrial uses.

U.S. Pat. No. 5,705,503 discloses a method for addition polymerization of a norbornene derivative using a Zwitterion complex prepared from palladium metal. However, this method requires an excess amount of the catalyst with respect to the amount of the monomer (the molar ratio of monomer to catalyst is less than 250) and a polymerization time of 12 hours or more for a relatively high yield. A similar method is disclosed in U.S. Pat. Nos. 6,262,194B1 and 6,265,506B1, which relates to a method for addition polymerization of norbornene using a Zwitterion complex prepared from palladium metal. This method is also disadvantageous in that the complex should be prepared by coordination of ligands of a specific structure with palladium metal, which makes it difficult to apply the method to industrial large-scaled production of the polymer.

European Patent Application No. 0 504 418A1 (filed on Sep. 23, 1992) discloses a method for addition polymerization of a cyclic olefin compound in the presence of A) a transition metal salt compound, B) a compound capable of forming an ionic complex with the compound A), and C) an organoaluminum compound.

Other examples of the cyclic olefin polymerization method using a transition metal as a catalyst include a cyclic olefin polymerization method using a Zirconocene compound and an aluminoxane compound (Japanese Patent Application Laid-open Kokai No. Sho 64-66216), and a method for copolymerization of norbornene and an olefin compound using a transition metal salt compound and an aluminoxane compound (Japanese Patent Laid-open Nos. 61-221206 and 64-106). However, these methods require an excess amount of the aluminoxane compound, causing discoloration of the product, and requiring a step of removing catalyst residues in the polymer after the polymerization reaction, thus reducing productivity.

Japanese Patent Laid Open Nos. 61-271308 and 62-252406 disclose methods for copolymerization of norbornene and olefin using a catalyst system comprising a vanadium compound and an organoaluminum compound, which methods involve an extremely low catalyst activity.

The methods for addition polymerization of a cyclic olefin compound using a metallocene catalyst are disclosed in U.S. Pat. Nos. 5,087,677 and 5,371,158, which are directed to a method for homo- and co-polymerizations of norbornene derivatives using a Ti-, Zr-, Hf-, V-, Nb- or Ta-based metallocene complex as a main catalyst and an aluminoxane compound as a cocatalyst. However, these methods mostly provide a low polymerization yield of less than 50%.

In addition, U.S. Pat. No. 5,621,054 discloses a method for copolymerization of norbornene and ethylene using a catalyst activator, N,N-dimethylanilinium tetrakis-perfluorophenylboron and a metallocene catalyst prepared by coordinating ligands of a unique structure to a metal such as Hf or Zr without an organoaluminum or aluminoxane compound. Disadvantageously, the method also has the difficulty in application to commercialized processes because of the extremely unique structures of the ligands and the catalyst activator.

In addition to the aforementioned problems, the above-described conventional techniques have the difficulty in forming a homogeneous catalyst system having a high solubility in a non-polar solvent and in preparing a cyclic olefin polymer having a high molecular weight in a high yield.

Compared with a solution polymerization using a homogeneous catalyst system having a high solubility in a non-polar solvent, a solution polymerization using a heterogeneous catalyst system forming a suspended solid due to incomplete dissolution in a non-polar solvent is ready to cause gel formation, so the gel thus produced greatly increases the solution viscosity of the polymer and accumulates on the wall of the reactor or the pipe line to inhibit the flow of reactants or products.

Namely, the heterogeneous catalyst system with poor solubility has a difficulty in quantitative control of the catalyst essential to the uniform progress of the reaction and the property control of the product, relative to the homogeneous catalyst system excellent in solubility.

SUMMARY OF THE INVENTION

In an attempt to improve the problems with the prior art, the inventors of the present invention have found out that the use of a mixture of a nickel salt compound, an organoaluminoxane compound and an organic boron compound as a catalyst system for addition polymerization of a cyclic olefin enables a preparation of a cyclic polymer having a high molecular weight in a high yield, thus accomplishing the present invention.

It is therefore an object of the present invention to provide a method for preparing a cyclic polymer having a high molecular weight in a high yield by using a homogeneous catalyst system having a high solubility in a non-polar solvent, allowing a simple quantitative measurement of the catalyst and inhibiting gel formation.

To achieve the object of the present invention, there is provided a method for preparing a cyclic polymer having a high molecular weight in a high yield using a complex prepared by mixing a nickel salt compound, an organoaluminoxane compound, and at least one organic boron compound selected from compounds represented by the following formulas 1 to 4:

$$BR_1R_2R_3 \qquad \text{Formula 1}$$

Wherein, $R_1$, $R_2$, and $R_3$ are different or the same and independently a $C_1$–$C_{10}$ alkyl group, $$B(OR_4)(OR_5)(OR_6) \qquad \text{Formula 2}$$

Wherein, $R_4$, $R_5$ and $R_6$ are different or the same and independently a $C_1$–$C_{10}$ alkyl group, $$BR_7R_8OR_9 \qquad \text{Formula 3}$$

Wherein, $R_7$, $R_8$, and $R_9$ are different or the same and independently a $C_1$–$C_{10}$ alkyl group,

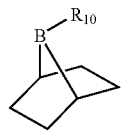

Formula 4

Wherein, $R_{10}$ is hydrogen atom, a $C_1$–$C_{10}$ alkyl group, or a $C_1$–$C_{10}$ alkoxy group, Hereinafter, the present invention will be described in further detail as follows.

The present invention is directed to a novel method for preparing a cyclic polymer having a high molecular weight in a high yield using a polymerization catalyst prepared by mixing at least one organic boron compound selected from the compounds represented by the formulas 1 to 4 with a nickel salt compound and an organoaluminoxane compound.

The term "cyclic olefin compound" as used herein refers to, if not specifically limited to, at least one selected from norbornene, dicyclopentadiene, and compounds represented by the following formulas 5 and 6, which can be used alone or in combination with at least two of them:

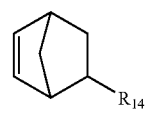

Formula 5 wherein $R_{14}$ is a $C_1$–$C_{20}$ alkyl group.

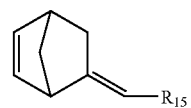

Formula 6 wherein $R_{15}$ is a $C_1$–$C_{20}$ alkyl group.

In the addition polymerization of a cyclic compound, the catalyst used herein comprises a nickel salt compound, an organic boron compound, and an organoaluminoxane compound.

First, the nickel salt compound is preferably a nickel-carboxylate compound containing ligands of a high solubility in a non-polar solvent. The specific examples of the nickel salt compound may include a nickel salt compound comprising a nickel-carboxylate containing at least 6 carbon atoms, such as nickel(hexanoate)$_2$, nickel(heptanoate)$_2$, nickel(octanoate)$_2$, nickel(2-ethylhexanoate)$_2$, nickel(naphthenate)$_2$, nickel(stearate)$_2$, and nickel(versatate)$_2$. Preferably, the nickel salt compound is used in an amount of $1.0 \times 10^{-5}$ to $1.0 \times 10^{-3}$ mole per 10 g of the monomer.

The specific examples of the trialkylborane compound represented by the formula 1 may include a trimethylborane, triethylborane, tripropylborane, tributylborane, and triisobutylborane.

The trialkoxyborane compounds represented by the formula 2 may include a trimethoxyborane, triethoxyborane, tripropanoxyborane, tributanoxyborane, and triisobutanoxyborane.

The dialkylalkoxyborane compounds represented by the formula 3 may include dimethylmethoxyborane, diethylethoxyborane, dipropylpropanoxyborane, dibutylbutaxonyborane, and diisobutylisobutanoxyborane.

The organic boron compound represented by the formula 4 includes 9-BBN (wherein, BBN is borabicyclo[3.3.3]nonane, hereinafter refered to "BBN"), B-methoxy-9-BBN, B-ethoxy-9-BBN, B-propanoxy-9-BBN, B-butanoxy-9-BBN, B-isobutanoxy-9-BBN, B-pentoxy-9-BBN, B-methyl-9-BBN, B-ethyl-9-BBN, B-propyl-9-BBN, B-butyl-9-BBN, B-isobutyl-9-BBN, and B-pentyl-9-BBN.

The specific examples of the organoaluminoxane compound may include methylaluminoxane, ethylaluminoxane, propylaluminoxane, butylaluminoxane, isobutylaluminoxane, etc. The use of an alkylaluminum compound that is used as a constituent component for the polymerization of a conventional diene compound, instead of the organoaluminoxane compound, results in an extremely low yield, bringing disadvantage in the aspect of economy in the industrial production, and causes a limitation in increasing the molecular weight of the polymer above a predetermined level.

The addition polymerization catalyst for preparation of a cyclic polymer is prepared by mixing the nickel salt compound, the organoaluminoxane compound, and the organic boron compound. The solvent used for preparation of the catalyst is suitably a non-polar solvent not reactive to the catalyst and specifically includes cyclohexane, hexane, benzene, toluene, chlorobenzene, o-dichlorobenzene, etc.

The organic boron compound represented by the formulas 1 to 4 is mixed with the nickel salt compound at a molar ratio of 1:1 to 30:1, preferably 3:1 to 10:1. The molar ratio of the organic boron compound to the nickel salt compound being less than 1 deteriorates the polymerization yield, while the molar ratio exceeding 30 causes discoloration of the product and deteriorated efficiency in the aspect of economy.

The organoaluminoxane compound and the nickel salt compound are mixed at a molar ratio of 18:1 to 200:1, preferably 20:1 to 100:1. The molar ratio of the organoaluminoxane compound to the nickel salt compound being less than 18 deteriorates the polymerization yield, while the molar ratio of the organoaluminoxane compound to the nickel salt compound exceeding 200 causes a discoloration of the product and a deterioration of the economical efficiency.

The addition sequence of the respective constituent components of the catalyst is in the order of a solution of a nickel salt compound, an organoaluminoxane compound, and then an organic boron compound selected from the compounds of the formulas 1 to 4. This addition sequence can be changed under circumstances.

The catalyst thus prepared is used for addition polymerization of a cyclic olefin to prepare the cyclic polymer of the present invention. The specific examples of the non-polar solvent used for polymerization may include aliphatic hydrocarbons such as hexane, isopentane, heptane, octane, or isooctane; cycloaliphatic hydrocarbons such as cyclopentane, methylcyclopentane, cyclohexane, methylcyclohexane, or ethylcyclohexane; or aromatic hydrocarbons such as benzene, toluene, chlorobenzene, or o-dichlorobenzene. The weight ratio of the polymerization solvent to the monomer is preferably in the range of 4:1 to 20:1. The polymerization yield increases in the order of o-dichlorobenzene>chlorobenzene>toluene>benzene>cyclohexane>hexane, which implies that the active complexes of the catalyst have somewhat polarity and that an increased polarity of the polymerization solvent stabilizes the complexes to increase the polymerization yield.

The polymerization solvent, which has a significant effect on the polymerization reaction, should be used under the condition free from oxygen and water. The polymerization reaction is initiated in the high-purity nitrogen atmosphere, and the polymerization temperature is preferably in the range from 0 to 100° C.

The cyclic polymer prepared by the present invention has a weight average molecular weight (Mw) of 50,000 to 1,500,000, and a molecular weight distribution (MWD) of 1.3 to 3.5. The polymerization reaction is carried out for 1 to 3 hours under a proper catalytic condition to produce a cyclic polymer in a yield of 70 to 100%. The reaction product after the polymerization reaction is precipitated with methanol or ethanol.

As described above, the cyclic polymer having a high molecular weight can be prepared in a high yield.

DETAILED DESCRIPTION OF THE INVENTION

Now, the present invention will be described in further detail by way of the following Examples, which are not intended to limit the scope of the present invention.

EXAMPLE 1

A catalyst for addition polymerization was prepared from nickel(2-ethylhexanoate)$_2$ (in 1% cyclohexane solution), methylaluminoxane (in 7% toluene solution) and triethylborane (in 1 M hexane solution). Here, nickel(2-ethylhexanoate)$_2$ was used in an amount of $1.0 \times 10^{-4}$ mole per 10 g of the monomer.

First, a sufficient amount of nitrogen was blown into a pressure reactor for polymerization. Toluene and norbornene were added to the reactor. Then, nickel(2-ethylhexanoate)$_2$, methylaluminoxane and triethylborane were sequentially added to the reactor (the molar ratio was 1:100:10, respectively). The polymerization reaction was carried out at 40° C. for 3 hours. Here, the weight ratio of a polymerization solvent to the monomer was 4.3:1. The reaction product thus obtained was precipitated with ethanol to complete the reaction.

EXAMPLES 2 TO 16

The procedures were performed to prepare polynorbornene in the same manner as described in Example 1, excepting that the conditions such as catalyst composition, polymerization solvent, polymerization time, organic boron compound and polymerization temperature were varied as presented in Table 1.

TABLE 1

| Div.[1] | Polymerization Catalyst[2] | Mole Ratio | Weight Ratio of Solvent/Monomer | Solvent[3] | Polymerization Time.(hr) |
|---|---|---|---|---|---|
| Example 1 | Nickel(2-EHA)$_2$/MAO/BEt$_3$ | 1:100:10 | 4.3 | Toluene | 3 |
| Example 2 | Nickel(2-EHA)$_2$/MAO/BEt$_3$ | 1:100:5 | 4.3 | Toluene | 3 |
| Example 3 | Nickel(2-EHA)$_2$/MAO/BEt$_3$ | 1:100:3 | 4.3 | Toluene | 3 |
| Example 4 | Nickel(2-EHA)$_2$/MAO/BEt$_3$ | 1:100:1 | 4.3 | Toluene | 3 |
| Example 5 | Nickel(2-EHA)$_2$/MAO/B(OMe)$_3$ | 1:100:10 | 4.3 | Toluene | 3 |
| Example 6 | Nickel(2-EHA)$_2$/MAO/B(OEt)$_3$ | 1:100:10 | 4.3 | Toluene | 3 |
| Example 7 | Nickel(2-EHA)$_2$/MAO/BEt$_2$OMe | 1:100:10 | 4.3 | Toluene | 3 |
| Example 8 | Nickel(2-EHA)$_2$/MAO/9-BBN | 1:100:10 | 4.3 | Toluene | 3 |
| Example 9 | Nickel(2-EHA)$_2$/MAO/9-BBN | 1:100:5 | 4.3 | Toluene | 3 |
| Example 10 | Nickel(2-EHA)$_2$/MAO/BM-9-BBN | 1:100:10 | 4.3 | Toluene | 3 |
| Example 11 | Nickel(2-EHA)$_2$/MAO/BEt$_3$ | 1:18:10 | 8.7 | o-Cl-Bz | 1 |
| Example 12 | Nickel(2-EHA)$_2$/MAO/9-BBN | 1:18:10 | 8.7 | o-Cl-Bz | 1 |
| Example 13 | Nickel(2-EHA)$_2$/MAO/BM-9-BBN | 1:18:10 | 8.7 | o-Cl-Bz | 1 |
| Example 14 | Nickel(2-EHA)$_2$/MAO/BEt$_2$OMe | 1:18:10 | 8.7 | o-Cl-Bz | 1 |
| Example 15 | Nickel(2-EHA)$_2$/MAO/B(OEt)$_3$ | 1:18:10 | 8.7 | o-Cl-Bz | 1 |
| Example 16 | Nickel(2-EHA)$_2$/MAO/B(C$_6$H$_5$)$_3$ | 1:18:10 | 8.7 | o-Cl-Bz | 1 |
| Example 17 | Nickel(2-EHA)$_2$/MAO/BEt$_3$ | 1:100:30 | 4.3 | Toluene | 1 |

Note:
[1] Polymerization temperature = 40° C.
[2] The components of catalyst were sequentially charged as indicated; Nickel(2-EHA)$_2$ = Nickel(2-Ethylhexanoate)$_2$; MAO = Methylaluminoxane; 9-BBN = 9-borabicyclo[3.3.3]nonane; BM-9-BBN = B-methoxy-9-borabicyclo[3.3.3]nonane.
[3] o-Cl-Bz = o-dichlorobenzene.

EXAMPLES 17 TO 25

The procedures were performed for polymerization in the same manner as described in Example 1, excepting that the copolymerization reaction of norbornene and a norobene derivative was carried out under the conditions as presented in Table 2.

TABLE 2

| Div.[1] | Polymerization Catalyst[2] | Mole Ratio | Norbornene Drivative[3] | Weight Ratio of Nb[4]/Nb Derivative | Polymerization Time (hrs) |
|---|---|---|---|---|---|
| Example 18 | Nickel(2-EHA)$_2$/BEt$_3$/MAO | 1:10:40 | Octyl-Nb | 9:1 | 1 |
| Example 19 | Nickel(2-EHA)$_2$/BEt$_3$/MAO | 1:10:40 | Octyl-Nb | 7:3 | 1 |
| Example 20 | Nickel(2-EHA)$_2$/BEt$_3$/MAO | 1:10:40 | Octyl-Nb | 1:1 | 1 |
| Example 21 | Nickel(2-EHA)$_2$/BEt$_3$/MAO | 1:10:40 | Hexyl-Nb | 9:1 | 1 |
| Example 22 | Nickel(2-EHA)$_2$/BEt$_3$/MAO | 1:5:40 | Hexyl-Nb | 7:3 | 1 |
| Example 23 | Nickel(2-EHA)$_2$/BEt$_3$/MAO | 1:5:40 | Hexyl-Nb | 1:1 | 1 |
| Example 24 | Nickel(2-EHA)$_2$/BEt$_3$/MAO | 1:5:100 | E-Nb | 9:1 | 1 |
| Example 25 | Nickel(2-EHA)$_2$/BEt$_3$/MAO | 1:5:100 | E-Nb | 7:3 | 2 |

TABLE 2-continued

| Div.[1] | Polymerization Catalyst[2] | Mole Ratio | Norbornene Derivative[3] | Weight Ratio of Nb[4]/Nb Derivative | Polymerization Time (hrs) |
|---|---|---|---|---|---|
| Example 26 | Nickel(2-EHA)$_2$/ BEt$_3$/MAO | 1:5:100 | DCPD | 9:1 | 2 |

Note:
[1] Polymerization temperature = 40° C.; Polymerization solvent = o-dichlorobenzene; Weight ratio of polymerization solvent/monomer = 8.7.
[2] The components of catalyst were sequentially charged as indicated; Nickel(2-EHA)$_2$ = Nickel (2-Ethylhexanoate)$_2$; MAO = Methylaluminoxane.
[3] Octyl-Nb = 5-Octyl-2-norbornene; Hexyl-Nb = 5-Hexyl-2-norbornene; E-Nb = 5-Ethylidene-2-norbornene; DCPD = Dicyclopentadiene.
[4] Nb = Norbornene.

EXAMPLES 26 TO 30

The procedures were performed for copolymerization of norbornene and 5-hexyl-2-norbornene in the same manner as described in Example 17, excepting that the conditions such as the catalyst composition and the organic boron compound were varied as presented in Table 3.

TABLE 3

| Div.[1] | Polymerization Catalyst[2] | Mole Ratio | Weight Ratio of Norbornene/ Hexyl-Nb[3] | Polymerization time(hr) |
|---|---|---|---|---|
| Example 27 | Nickel(2-EHA)$_2$/ MAO/BEt$_3$ | 1:30:10 | 1:1 | 1 |
| Example 28 | Nickel(2-EHA)$_2$/ MAO/B(OEt)$_3$ | 1:30:10 | 1:1 | 1 |
| Example 29 | Nickel(2-EHA)$_2$/ MAO/BEt$_2$OMe | 1:30:10 | 1:1 | 1 |
| Example 30 | Nickel(2-EHA)$_2$/ MAO/9-BBN | 1:30:10 | 1:1 | 1 |
| Example 31 | Nickel(2-EHA)$_2$/ MAO/BM-9-BBN | 1:30:10 | 1:1 | 1 |
| Example 32 | Nickel(2-EHA)$_2$/ MAO/C(C$_6$H$_5$)$_3$ | 1:30:10 | 1:1 | 1 |

Note:
[1] Polymerization temperature = 40° C.; Polymerization solvent: o-dichlorobenzene; Weight ratio of polymerization solvent/monomer = 8.7.
[2] The components of catalyst were sequentially charged as indicated; Nickel(2-EHA)$_2$ = Nickel(2-Ethylhexanoate)$_2$; MAO = Methylaluminoxane; 9-BBN = 9-Borabicyclo-[3.3.3]nonane; BM-9-BBN = B-methoxy-9-borabicyclo[3.3.3]nonane.
[3] Hexyl-Nb = 5-Hexyl-2-norbornene.

COMPARATIVE EXAMPLES 1 TO 9

The procedures were performed to prepare a polynorbornene polymer in the same manner as described in Example 1, excepting that (1) the organic boron compounds of the formulas 1 to 4 were not used; that (2) another metal salt compound was used as a main catalyst; that (3) another cocatalyst other than the organic boron compounds of the formulas 1 to 4 was used; or that (4) an aluminum compound was used instead of MAO. The results are presented in Table 4.

TABLE 4

| Div.[1] | Polymerization Catalyst[2] | Mole Ratio | Weight Ratio of Solvent/Monomer | Solvent[3] | Polymerization Time (hr) |
|---|---|---|---|---|---|
| Comparative Example 1 | Nickel(2-EHA)$_2$/ MAO | 1:15 | 8.7 | o-Cl-Bz | 1 |
| Comparative Example 2 | Co(naph)$_2$/ MAO | 1:200 | 4.3 | Toluene | 3 |
| Comparative Example 3 | Co(naph)$_2$/ MAO | 1:200 | 4.3 | CHX | 3 |
| Comparative Example 4 | Co(naph)$_2$/ MAO/B(C$_6$F$_5$)$_3$ | 1:200:10 | 4.3 | Toluene | 3 |
| Comparative Example 5 | Nickel(2-EHA)$_2$/ MAO/BB-9-BBN | 1:100:10 | 4.3 | Toluene | 3 |
| Comparative Example 6 | Nd(vers)$_3$/ MAO | 1:200 | 4.3 | CHX | 3 |
| Comparative Example 7 | Nickel(2-EHA)$_2$/ MAO/BF$_3$.H$_3$PO$_4$ | 1:25:10 | 4.3 | Cl-Bz | 2 |
| Comparative Example 8 | Nickel(2-EHA)$_2$/ AlEt$_3$/BEt$_3$ | 1:100:10 | 4.3 | Toluene | 3 |

TABLE 4-continued

| Div.[1] | Polymerization Catalyst[2] | Mole Ratio | Weight Ratio of Solvent/Monomer | Solvent[3] | Polymerization Time (hr) |
|---|---|---|---|---|---|
| Comparative Example 9 | Nickel(2-EHA)$_2$/ AlEt$_3$/BEt$_3$ | 1:50:10 | 4.3 | Toluene | 3 |

Note:
[1] Polymerization time = 40° C.
[2] The components of catalyst were sequentially charged as indicated; Nickel(2-EHA)$_2$ = Nickel (2-Ethylhexanoate)$_2$; MAO = Methylaluminoxane; Co(naph)$_2$ = Co(naphthenate)$_2$; Nd(vers)$_3$ = Nd(versatate)$_3$; BM-9-BBN = B-methoxy-9-borabicyclo[3.3.3]nonane.
[3] o-Cl-Bz = o-dichlorobenzene; CHX = cyclohexane; Cl-Bz = chlorobenzene

COMPARATIVE EXAMPLES 10 TO 14

The procedures were performed to prepare a polynorbornene copolymer in the same manner as described in Example 17, excepting that (1) the organic boron compounds of the formulas 1 to 4 were not used; or that (2) another aluminum compound was used instead of MAO. The results are presented in Table 5.

TABLE 5

| Div.[1] | Polymerization Catalyst[2] | Mole Ratio | Norbornene Derivative[3] | Weight Ratio of Nb[4]/Nb Derivative | Solvent[5] |
|---|---|---|---|---|---|
| Comparative Example 10 | Nickel(2-EHA)$_2$/ MAO | 1:100 | Octyl-Nb | 1:1 | Toluene |
| Comparative Example 11 | Nickel(2-EHA)$_2$/ MAO | 1:100 | E-Nb | 1:1 | o-Cl-Bz |
| Comparative Example 12 | Nickel(2-EHA)$_2$/ AlEt$_3$/BEt$_3$ | 1:100:10 | Hexyl-Nb | 1:1 | o-Cl-Bz |
| Comparative Example 13 | Nickel(2-EHA)$_2$/ AlEt$_3$/BEt$_3$ | 1:200:10 | Hexyl-Nb | 1:1 | o-Cl-Bz |
| Comparative Example 14 | Nickel(2-EHA)$_2$/ AlEt$_3$/BEt$_3$ | 1:200:10 | Octyl-Nb | 1:1 | o-Cl-Bz |

Note:
[1] Polymerization time: Comparative examples 10 = 4 hours; Comparative examples 11 = 2 hours; Comparative examples 12–14 = 3 hours; Polymerization temperature = 40° C.; Weight ratio of polymerization solvent/monomer = 8.7.
[2] The components of catalyst were sequentially charged as indicated; Nickel(2-EHA)$_2$ = Nickel(2-Ethylhexanoate)$_2$; MAO = Methylaluminoxane.
[3] Octyl-Nb = 5-Octyl-2-norbornene; E-Nb = 5-Ethylidene-2-norbornene; Hexyl-Nb = 5-Hexyl-2-norbornene.
[4] Nb = Norbornene
[5] o-Cl-Bz = o-dichlorobenzene

EXPERIMENTAL EXAMPLE 1

The yields and $M_w$s of the homo- and co-polymers as prepared in Examples 1 to 30 and Comparative Examples 1 to 14 were measured. The results are presented in Table 6.

TABLE 6

| Div. | Yield (%) | Mw | MWD |
|---|---|---|---|
| Example 1 | 98.6 | 177,000 | 1.42 |
| Example 2 | 95.3 | 147,000 | 1.65 |
| Example 3 | 89.5 | 161,000 | 1.54 |
| Example 4 | 76.9 | 259,000 | 2.31 |
| Example 5 | 73.9 | 159,000 | 1.53 |
| Example 6 | 74.1 | 165,000 | 1.47 |
| Example 7 | 82.2 | 166,000 | 1.46 |
| Example 8 | 94.1 | 147,000 | 1.81 |
| Example 9 | 92.7 | 150,000 | 1.59 |
| Example 10 | 92.6 | 141,000 | 1.74 |
| Example 11 | 94.8 | 864,000 | 3.15 |
| Example 12 | 75.4 | 962,000 | 2.61 |
| Example 13 | 86.8 | 885,000 | 2.75 |
| Example 14 | 86.5 | 956,000 | 2.44 |
| Example 15 | 79.4 | 1,037,000 | 2.63 |
| Example 16 | 85.4 | 837,000 | 2.88 |
| Example 17 | 83.7 | 260,000 | 2.55 |
| Example 18 | 100 | 771,000 | 3.19 |

TABLE 6-continued

| Div. | Yield (%) | Mw | MWD |
|---|---|---|---|
| Example 19 | 92.7 | 501,000 | 2.85 |
| Example 20 | 71.5 | 494,000 | 2.27 |
| Example 21 | 100 | 919,000 | 3.29 |
| Example 22 | 100 | 834,000 | 3.30 |
| Example 23 | 89.1 | 829,000 | 2.49 |
| Example 24 | 91.0 | 206,000 | 2.51 |
| Example 25 | 74.0 | 67,000 | 1.92 |
| Example 26 | 99.2 | 209,000 | 2.09 |
| Example 27 | 75.1 | 992,000 | 2.45 |
| Example 28 | 80.6 | 737,000 | 2.04 |
| Example 29 | 84.9 | 735,000 | 1.85 |
| Example 30 | 78.1 | 737,000 | 2.04 |
| Example 31 | 81.5 | 592,000 | 2.17 |
| Example 32 | 81.8 | 783,000 | 2.47 |
| Comparative Example 1 | 53.2 | 1,245,000 | 2.33 |
| Comparative Example 2 | 0.5 | — | — |
| Comparative Example 3 | 0 | — | — |
| Comparative Example 4 | 0.3 | — | — |
| Comparative Example 5 | 60.4 | 173,000 | 1.44 |
| Comparative Example 6 | 0.5 | — | — |
| Comparative Example 7 | 23.0 | 326,000 | 2.03 |
| Comparative Example 8 | 1.6 | 19,000 | 1.36 |
| Comparative Example 9 | 4.9 | 76,000 | 2.39 |
| Comparative Example 10 | 16.5 | 96,000 | 1.72 |
| Comparative Example 11 | 28.5 | 14,000 | 1.75 |
| Comparative Example 12 | 4.3 | 1) | 1) |
| Comparative Example 13 | 13.3 | 1) | 1) |
| Comparative Example 14 | 14.0 | 1) | 1) |

Note:
1) It is not measurable because the samples are not soluble in 1,2,4-trichlorobenzene.

As described above, the method for preparing homo- and co-polymers according to the present invention includes mixing a nickel salt compound, an organoaluminoxane compound and an organic boron compound selected from the compounds of the formulas 51 to 4 to prepare a complex having a high solubility in a non-polar solvent, and then polymerizing a cyclic olefin compound in the presence of the complex as a catalyst in a non-polar solvent, which method inhibits gel formation and provides a cyclic polymer having a high molecular weight in a high yield.

The invention claimed is:

1. A method for preparing homo- and co-polymers by polymerizing cyclic olefin compounds with a catalyst in a non-polar solvent, the catalyst including a complex prepared by mixing a nickel salt compound, an organoaluminoxane compound, and at least one organic boron compound selected from compounds represented by the following formulas 1 to 4:

$BR_1R_2R_3$    Formula 1

Wherein, $R_1$, $R_2$, and $R_3$ are different or the same and independently a $C_1$–$C_{10}$ alkyl group, $B(OR_4)(OR_5)(OR_6)$    Formula 2

Wherein, $R_4$, $R_5$ and $R_6$ are different or the same and independently a $C_1$–$C_{10}$ alkyl group, $BR_7R_9$    Formula 3

Wherein, $R_7$, $R_8$, and $R_9$ are different or the same and independently a $C_1$–$C_{10}$ alkyl group, and

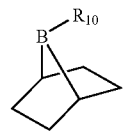

Formula 4

Wherein, $R_{10}$ is a hydrogen atom, a $C_1$–$C_{10}$ alkyl group, or a $C_1$–$C_{10}$ alkoxy group.

2. The method as claimed in claim 1, wherein the organic boron compound represented by the formula 1 includes at least one selected from the group consisting of trimethylborane, triethylborane, tripropylborane, tributylborane, and triisobutylborane.

3. The method as claimed in claim 1, wherein the organic boron compound represented by the formula 2 includes at least one selected from the group consisting of trimethoxyborane, triethoxyborane, tripropanoxyborane, tributanoxyborane, and triisobutanoxyborane.

4. The method as claimed in claim 1, wherein the organic boron compound represented by the formula 3 includes at least one selected from the group consisting of dimethylmethoxyborane, diethylethoxyborane, dipropylpropanoxyborane, dibutylbutaxonyborane, and diisobutylisobutanoxyborane.

5. The method as claimed in claim 1, wherein the organic boron compound represented by the formula 4 includes at least one selected from 9-BBN, B-methoxy-9-BBN, B-ethoxy-9-BBN, B-propanoxy-9-BBN, B-butanoxy-9-BBN, B-isobutanoxy-9-BBN, B-pentoxy-9-BBN, B-methyl-9-BBN, B-ethyl-9-BBN, B-propyl-9-BBN, B-butyl-9-BBN, B-isobutyl-9-BBN, and B-pentyl-9-BBN.

6. The method as claimed in claim 1, wherein the nickel salt compound includes at least one nickel-carboxylate selected from the group consisting of nickel(hexanoate)$_2$, nickel(heptanoate)$_2$, nickel(octanoate)$_2$, nickel(2-ethylhexanoate)$_2$, nickel(naphthenate)$_2$, nickel(stearate)$_2$, and nickel(versatate)$_2$.

7. The method as claimed in claim 1, wherein the nickel salt compound is used in an amount of $1.0 \times 10^{-5}$ to $1.0 \times 10^{-3}$ mole per 10 g of the cyclic compound.

8. The method as claimed in claim 6, wherein the nickel salt compound is used in an amount of $1.0 \times 10^{-5}$ to $1.0 \times 10^{-3}$ mole per 10 g of the cyclic compound.

9. The method as claimed in claim 1, wherein the organoaluminoxane compound includes at least one selected from the group consisting of methylaluminoxane, ethylaluminoxane, propylaluminoxane, butylaluminoxane, and isobutylaluminoxane.

10. The method as claimed in claim 1, wherein the cyclic olefin compound includes at least one selected from norbornene, dicyclopentadiene, and compounds represented by the following formulas 5 and 6:

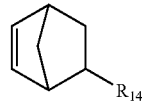

Formula 5 wherein, $R_{14}$ is a $C_1$–$C_{20}$ alkyl group,

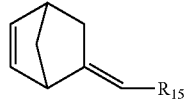

Formula 6 wherein, $R_{15}$ is a $C_1$–$C_{20}$ alkyl group.

11. The method as claimed in claim 1, wherein the organic boron compounds represented by the formulas 1 to 4 and the nickel salt compound are used at a molar ratio of 1:1 to 30:1.

12. The method as claimed in claim 1, wherein the organic boron compounds represented by the formulas 1 to 4 and the nickel salt compound are used at a molar ratio of 3:1 to 10:1.

13. The method as claimed in claim 11, wherein the organic boron compounds represented by the formulas 1 to 4 and the nickel salt compound are used at a molar ratio of 3:1 to 10:1.

14. The method as claimed in claim 1, wherein the organoaluminoxane compound and the nickel salt compound are used at a molar ratio of 18:1 to 200:1.

15. The method as claimed in claim 1, wherein the organoaluminoxane compound and the nickel salt compound are used at a molar ratio of 20:1 to 100:1.

16. The method as claimed in claim 14, wherein the organoaluminoxane compound and the nickel salt compound are used at a molar ratio of 20:1 to 100:1.

17. The method as claimed in claim 1, wherein the non-polar solvent includes at least one selected from the group consisting of hexane, isopentane, heptane, octane, isooctane, cyclcopentane, methyl cylcopentane, cylcohexane, methylcyclohexane, ethylcyclohexane benzene, toluene, chlorobenzene, and o-dichlorobenzene.

* * * * *